Patented Sept. 29, 1942

2,297,651

UNITED STATES PATENT OFFICE 2,297,651

CHEWING GUM BASE

Carl E. Hartwig, Teaneck, N. J., and Boris N. Lougovoy, Jackson Heights, N. Y., assignors to American Chicle Company, Long Island City, N. Y., a corporation of New Jersey No Drawing. Application April 20, 1940, Serial No. 330,698

11 Claims. (Cl. 99—135)

This invention relates to the discovery that the latex coagulum of *Asclepias syriaca* and the equivalent is operative as an excellent constituent or base for chewing gum.

*Asclepias syriaca*, which is commonly known as the milkweed plant, belongs to the family of Asclepias which also includes *Asclepias subulata*, *Asclepias erosa*, *Asclepias sullivanti* and thirty-seven other species.

It has long been known that the secretion from the plants of the Asclepias family contains rubber-like substances. Many attempts have been made in the past, going back as far as 1873—U. S. Patent No. 140,281 to Daniel M. Lamb—to commercially utilize the non-cellulosic constituents of the milkweed. Particular efforts have been made to make use of the rubber extracted from these plants. So far as we are aware, no useful commercial product has been derived from the milkweed or from other species of the same family. The rubber which was extracted did not have all the requirements necessary for successful commercial development.

Chewing gum has for a great many years constituted an important article of commerce. It is specifically a composition of a chewing gum base with sugar and flavoring materials. The specific characteristics of the article, which may be termed "chewability" or "chewiness," are determined essentially by the properties of the chewing gum bases. The composition of the existing chewing gum bases may be broadly divided into two classes: I, bases composed of a blend of the so-called crude natural gums, all of which are imported materials, and II, bases made of the combination of rubber (*Havea brasiliensis*) with waxes, hydrogenated oils, resins, and similar constituents.

It is recognized by those familiar with the art that the best chewiness or chewability is produced by the use of chicle, a natural gum from Central America, belonging to the family of Sapodilla (Sapotaceae). Owing to certain limitations in the supply of chicle, it was necessary to use natural gums, such as jelutong (Pontianak) and Perillos obtainable from South and Central America and from the Far East. Because none of the presently used crude natural gums approaches the chicle in its property as chewing gum base, it has not been possible so far to produce a chewing gum base having properties approximating the base made with chicle, by using any of such raw gums alone. All existing "chicle substitutes" are a blend of several natural raw gums with some added materials and all of such bases, which do not contain chicle as the major component, cannot be fully substituted for chicle as they are lacking in one or another of the essential properties. The same remark applies even more strongly to the bases of the second class mentioned above. One of the inherent properties of natural chicle, which is the most difficult to duplicate by the use of other crude gums, is what is called "fullness of the chew," and especially the combination of proper fullness with proper smoothness or velvetiness and combination with proper resiliency of the chew.

Although substantially continuous research has been conducted for at least twenty years to obtain a chewing gum base from natural gums other than chicle having the desirable characteristics of natural chicle, no such base has been found prior to our discovery as now described in detail.

We have found that properly coagulated and properly treated milkweed latex produces a substance resembling natural crude gums used in the chewing gum industry, which is not only suitable as an ingredient of the chewing gum base but which also results in a product having properties closely similar to chewing gum made with natural chicle as the base. We have discovered that an excellent chewing gum base favorably comparable with bases containing chicle in substantial quantity, may be prepared from the products present in milkweed juices, using these products as the major component of the chewing gum base and without the use of chicle. In brief, we have discovered that milkweed gum in contradistinction to other known crude gums may be used alone as the major constituent in a chewing gum base, producing a product closely approaching in properties that made with chicle. We also have found that milkweed gum may be substituted for chicle in a blend with other natural gums, producing a similar beneficial effect upon the chewing quality of the blend.

The milkweed, *Asclepias syriaca*, a dicotyledon, may be propagated by seed, in which case a typical annual is produced, or by vegetative growth of the root. The latter method appears more efficient and produces a hardier plant. The plants develop locally early in May and reach maturity approximately in mid June; at this time, blossoms begin to form, full bloom is attained between the middle of June and July, depending, naturally, upon the weather conditions. The plants vary in size from one (1) foot to five and one-half (5½) feet in height, with respective increase in diameter of the stem and the leaf size. These are naturally dependent upon the vitality of the plant, its habitat, and the climatic conditions. The lactiferous system of the milkweed plant is composed of individual cells, and structurally resembles that of the *Urticaceae* and *Apocynaceae* rubber producing trees found in Borneo and Jamaica. It appears that in the milkweed, the latex is produced as a pathological action, dependent upon the existence of complete cell structure: for upon crushing a freshly picked (uprooted) plant, only a green nectar is obtained. The latex is only obtained when the stem is scarified or the leaves or leaf nodes injured. It has been observed that milkweed plants possess remarkable recuperative powers. Plants cut down to a height of four (4) inches from the ground, grow new stalks from within 10 to 21 days. If the cut is properly made at the interstices of the leaf nodes and stem, two new stalks develop, both of which soon give a copious yield of latex.

The above description of the common milkweed plant has been given in detail because this species may be considered as the best known representative of the family of Asclepias, and reference to it will be used in the following discussions and examples. However, it should be expressly understood that we do not wish to limit ourselves to this particular species, but that our invention covers other species of the same botanical family.

A heretofore proposed method of obtaining a rubbery compound from milkweed consisted of fermenting the plant when in the green state, removing the juice from the woody fibres, and boiling out the water. Under these conditions, the resulting product, which is probably a mixture of guttas, resins, and water soluble substances, is a gummy, bitter, sticky substance which is entirely unsuitable as a base for chewing gum. The gummy mass so obtained contains sugars, chlorophylls, enzymes and glucosides. All of these materials, according to our findings, interfere either with the chewing characteristics of the product or with the taste characteristics, such as bitterness produced by glucosides. Under another process (U. S. Patent No. 1,740,079 issued to T. A. Edison), the milkweed plant is dried, worked in a ball mill machine with water, and the separated rubbery mass is collected as a float on top of the water in a storage tank. The material so separated under this process is a sticky gutta which has no properties which are usually associated with any of the natural gums suitable for use in chewing gum base, nor could it be used as a gutta constituent of such bases in combination with waxes and resins.

We have found that an entirely different product can be obtained if a milkweed latex is collected from uncut plants, by cutting the stem or leaves. When such latex is diluted with water to about 50 per cent and the resulting emulsion is warmed to about 80–90 degrees C., a coagulation takes place with the formation of a white, soft gummy material. This material has at first a bitter taste and is somewhat soft and sticky, but when well washed with water it produces a pure white gum having no taste and only a very faint ester-like odor, when warmed. This gum, after the excess water is removed so that the moisture content of the material is about 50 per cent, has a smooth, full, velvety, somewhat tough (as compared with chicle) chew. Although it is possible to coagulate the latex by simple dilution with a large amount of water, or by direct heating of the latex to about 90 degrees C. without diluting it with water, we have found that the best results are obtained when the latex is first diluted with water to not more than half of its volume and then heated to about 80 to 90 degrees C. This process helps the formation of the proper physical structure of the resulting gum, and also helps the subsequent removal of impurities by washing. The crude milkweed gum thus obtained may be milled or masticated and treated in the same manner as the crude gums, commonly used in chewing gum, are masticated in order to reduce the original elasticity and the original toughness. The crude milkweed gum may be blended with modifying agents, such as resins, to adjust its properties to the desired point. We have found that milkweed gum, after being masticated or milled sufficiently to reduce its viscosity to the point close to that of the gum chicle, may be used in chewing gum base in as large a proportion as 90 per cent of the total weight of base, producing a product quite similar in properties to the one which could only be obtained by the use of a substantial amount of gum chicle in the base. In this case, the remaining components would be non-gummy ingredients, such as natural or synthetic resins, waxes, or high fatty acids.

Although the method of producing a coagulum from the milkweed plant just described is the simplest and the best way of preparing the crude product, there are other methods which may be used. We have found, for instance, that the whole milkweed plant may be cut and then squeezed through a vegetable juice squeezer or through a similar machine. This operation results in the extraction of a green watery solution, the amount of which is about 75 per cent of the weight of the plant. The crude juice so obtained may then be treated with acid or it may be heated in order to effect a coagulation of a soft, dark green gummy solid. The resulting gum contains chlorophyll and soluble matters and has to be further purified before it can be used satisfactorily in a chewing gum base. It is also possible to dry the cut plant and to extract the dried product with a suitable solvent. Here again, the resulting product is a dark colored sticky mass which has to be further purified, since it is not suitable in this stage as a constituent of a chewing gum base. Because of the presence of chlorophyll, the purification of the crude product referred to in the last two cases is rather a tedious and lengthy procedure. According to our experience, the presence of water soluble materials, as well as chlorophyll, renders the milkweed gum coagulum unsuitable for use in chewing gum base, because these impurities produce stickiness and distort the physical structure of the gummy product essential for a good chewing gum base. Furthermore, we have found that it is not sufficient merely to extract guttas and resins present in milkweed gum in order to obtain a good material for a chewing gum base. This is evident from the fact that if the guttas and resins are extracted separately and then recombined, the resulting product is much inferior from the standpoint of a chewing gum base. In order to obtain a satisfactory product, the blend of the milkweed gum components should be made in such a way that the essential components—gutta and resins—are coagulated together from their suspension in a liquid. This operation may be accomplished by emulsifying the extracted materials in an alkaline medium and then acidifying the resulting product. The following examples will illustrate our invention, with the understanding that the compositions given are not limited to the specific materials mentioned, but that each of the auxiliary materials may be replaced by one having similar physical properties, such as the melting point, solubility, friability, toughness, etc.

EXAMPLE 1

*Collection of the milkweed latex and its properties*

The latex from Asclepias syriaca was collected in suction flasks. An Erlenmeyer flask was fitted with a two (2) holed rubber stopper. Two glass tubes were inserted; one an L tube, the other rounded at the end and sharply constricted. To the L tube, as aspirator bulb was attached so that upon deflating the bulb, air is drawn through the flask to reinflate the aspirator bulb. The plant was cut at the first and topmost interstices of the leaf nodes and stem; the cut was made horizontally to the ground, but not completely through the stem. Enough outer stem coating was left intact to permit the cut portions to be suspended in inverted position parallel to the uncut portion of the plant. In this way, a cup-like surface was exposed from which the latex could easily be collected. This procedure was followed with each set of alternate leaf nodes to approximately 4" to 5" from the ground.

Each plant of the average height of 2½ to 3 feet yields from 6 to 8 cc. of latex. The latex is pure milk white with a clean ester-like odor, a little heavier than water and possesses a pH value of 4.8 to 5.2.

Approximately the same results were obtained when the same method was applied to Asclepias sullivanti and Asclepias tuberosa, other varieties of milkweed.

EXAMPLE 2

*Preparation of gum, using latex collected from Asclepias syriaca, Asclepias sullivanti and Asclepias tuberosa*

A proportion of 2700 grams (about 6 pounds) of the milkweed latex was diluted with 2500 cc. of water, and then gradually heated to about 80 degrees C., with constant stirring. When the temperature reached about 60 degrees C., a coagulum began to form first on the bottom of the container; as the temperature rose, the coagulum became more abundant and began to form a sort of ball around the stirrer. The treatment was continued until the gum formed a solid mass in a clear solution. The coagulated gum was then removed and the excess water was squeezed out. The product had a good chew in general, but was slightly sticky and had a pronounced bitter taste. The coagulum was then repeatedly washed in hot water with mastication until the bitter taste disappeared. The addition of a small amount of caustic (to form about 0.5 per cent solution with water) helped to speed up the washing. The alkali, of course, was then neutralized and the gum washed free from the solvent. This purification resulted in not only the elimination of the bitter taste, but it also eliminated stickiness and the resulting gum had remarkably good properties as a material to serve as a chewing gum base, resembling in many respects the gum chicle, particularly with respect to fullness of the chew. After the washing treatment, the gum was pressed to expel the excess water. About 1000 grams of wet gum were so obtained. This wet gum when completely dried yielded about 240 grams of dry gum.

EXAMPLE 3

*Gum base containing milkweed gum as major and sole gummy constituent*

Ninety parts, on a dry basis, of milkweed gum obtained as described in Example 2, were melted in a gum mixer and masticated at a kettle temperature of about 90 to 100 degrees C. until its elasticity (viscosity) was reduced to about that of melted gum chicle. In this particular case, the time required was one hour. 10 per cent of balata resin of the softening point 69–70 degrees C. was then mixed with the gum and the mixing was continued until the moisture content of the base was reduced to about 3 to 5 per cent of the total weight. The resulting base had a good set-up when cooled; the chew was excellent except for the somewhat excessive toughness at the start. The chew compared quite favorably with the chew of bases containing a large percentage of chicle. Approximately, it may be said that the chew was equal to a base composed of about 80 parts of chicle and 20 parts of a substitute made with a blend of about 60 per cent of Jelutong and 40 per cent of other commonly used natural gums, such as gutta soh, gutta kay, etc. These substitutes usually have a chew quite inferior to that of chicle.

EXAMPLE 4

Gum base similar to that given in Example 3, in which balata was replaced with resenes extracted from gum elemi.

EXAMPLE 5

Gum base similar to the one given in Example 3, in which the balata resin was replaced with ester gum of softening point of 72 degrees C.

EXAMPLE 6

*Chewing gum*

| | Parts |
|---|---|
| Base from Example 3 | 20 |
| Soft sugars (glucose) | 16 |
| Granulated sugar | 64 |
| Flavor to suit. | |

The gum had normal properties, and the chew characteristics as for base in Example 3. The initial excess toughness noticed in the base was not nearly so pronounced in the gum.

EXAMPLE 7

*Chewing gum base representing a blend of milkweed gum with other natural gums in which blend milkweed gum replaced gum chicle*

| | Parts |
|---|---|
| Milkweed gum | 65 |
| Gutta soh | 10 |
| Gutta kay | 10 |
| Carnauba wax | 10 |
| Hydrogenated oil | 5 |

The milkweed gum, containing 55 per cent moisture, was placed in the gum mixer and was masticated for 30 minutes. When the temperature was about 70 degrees C., the other ingredients were added in the regular manner.

Having described our invention, what we claim and desire to secure by Letters Patent, is as follows:

1. A chewing gum base comprising latex coagulum characterized by a water content not substantially exceeding 50% and by absence of any substantial proportion of chlorophyl and substantial absence of stickiness, from the group of plants comprising Asclepias syriaca, Asclepias sullivanti, Asclepias tuberosa, Asclepias subulata and Asclepias erosa.

2. A chewing gum base comprising in predominant proportion latex coagulum characterized by a water content not substantially exceeding 50% and by absence of any substantial proportion of chlorophyl and substantial absence of stickiness, from the group of plants comprising Asclepias syriaca, Asclepias sullivanti, Asclepias tuberosa, Asclepias subulata and Asclepias erosa.

3. A chewing gum base comprising latex coagulum characterized by a water content not substantially exceeding 50% and by absense of any substantial proportion of chlorophyl and substantial absence of stickiness, obtained from the Asclepias syriaca plant.

4. A chewing gum base comprising in predominant proportion latex coagulum characterized by a water content not substantially exceeding 50% and by absence of any substantial proportion of chlorophyl and substantial absence of stickiness, from the Asclepias syriaca plant.

5. A chewing gum base comprising latex coagulum characterized by a water content not substantially exceeding 50% and by absence of any substantial proportion of chlorophyl and substantial absence of stickiness, from Asclepias syriaca and a resin.

6. A chewing gum base comprising latex coagulum from Asclepias syriaca and a natural resin of softening point between 60 and 80 degrees C.

7. A chewing gum base comprising latex coagulum characterized by a water content not substantially exceeding 50% and by absence of any substantial proportion of chlorophyl and substantial absence of stickiness, from Asclepias syriaca and a synthetic resin of softening point of about 60 to 80 degrees C.

8. A chewing gum base comprising latex coagulum characterized by a water content not substantially exceeding 50% and by absence of any substantial proportion of chlorophyl and substantial absence of stickiness, from Asclepias syriaca and balata resin of softening point of 65 to 75 degrees C.

9. A chewing gum base comprising 90% of the latex coagulum characterized by a water content not substantially exceeding 50% and by absence of any substantial proportion of chlorophyl and substantial absence of stickiness, from Asclepias syriaca and 10% balata resin.

10. A chewing gum base comprising latex coagulum characterized by a water content not substantially exceeding 50% and by absence of any substantial proportion of chlorophyl and substantial absence of stickiness, from Asclepias syriaca in a blend with natural gums, waxes, and fatty materials.

11. A chewing gum made with latex coagulum characterized by a water content not substantially exceeding 50% and by absence of any substantial proportion of chlorophyl and substantial absence of stickiness, from Asclepias syriaca, soft sugars, granulated sugar and flavor.

CARL E. HARTWIG.
BORIS N. LOUGOVOY.